United States Patent [19]
Opal et al.

[11] 3,766,497
[45] Oct. 16, 1973

[54] METHOD AND APPARATUS FOR PULSE WIDTH MODULATION WITH VARIABLE FREQUENCY MODES
[75] Inventors: Kenneth E. Opal, William H. Ley, both of Oakmont, Pa.
[73] Assignee: Power Control Corporation, Pittsburgh, Pa.
[22] Filed: Jan. 21, 1972
[21] Appl. No.: 219,733

[52] U.S. Cl.................. 332/9 R, 307/265, 318/341, 328/58, 332/14
[51] Int. Cl. ............................................. H03k 7/08
[58] Field of Search .................. 332/9 R, 9 T, 11 D, 332/14; 328/58; 307/265; 318/341; 325/142

[56] References Cited
UNITED STATES PATENTS
3,668,560  6/1972  Padalino ............................. 332/9 R
3,548,342  12/1970  Maxey .................................. 332/9 R Primary Examiner—Alfred L. Brody
Attorney—Brown, Murray, Flick & Peckham

[57] ABSTRACT

The number of pulses modulated during each period of the input frequency to a pulse width modulator is controlled to be a multiple of the input frequency, where the multiple is changed as predetermined frequency range boundaries are crossed. The frequency multiple is increased inversely with the frequency range so that, at lower frequency ranges a greater number of pulses are modulated during each period. Unstable frequency multiple switching is prevented at the frequency range boundary crossover by defining each boundary as two crossover limits where one limit is at a frequency slightly higher than the boundary and the other limit is at a frequency slightly lower than the boundary. Decreasing frequency (increasing period) then crosses a first limit at a frequency slightly lower (longer period) than the boundary and increasing frequency (decreasing period) crosses a second limit at a frequency slightly higher (shorter period) than the boundary.

5 Claims, 15 Drawing Figures

FIG. 2A.
| SAMPLE CODE (CC) CB CA | CONTROL CODE (FC) | NO. PULSES PER PERIOD | FREQUENCY RANGE |
|---|---|---|---|
| 0  0 | F0 | 6 | $60 \leq F\ out$ |
| 0  1 | F1 | 12 | $30 \leq F\ out < 60$ |
| 1  0 | F2 | 24 | $15 \leq F\ out < 30$ |
| 1  1 | F3 | 48 | $F\ out < 15$ |
FIG. 3.
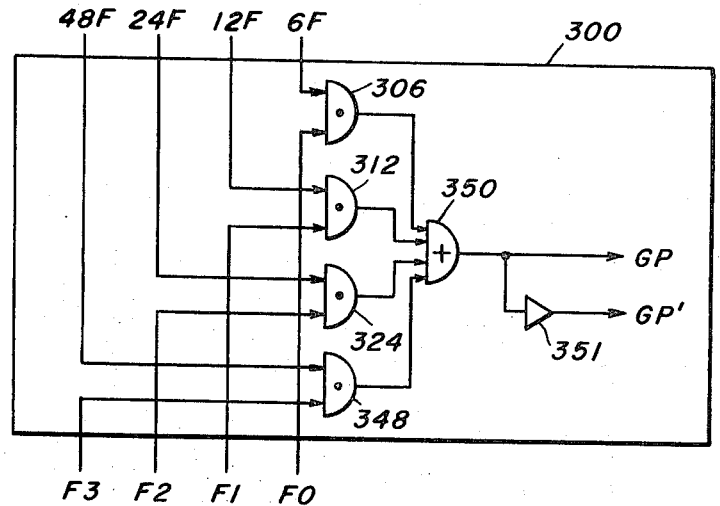
FIG. 4.
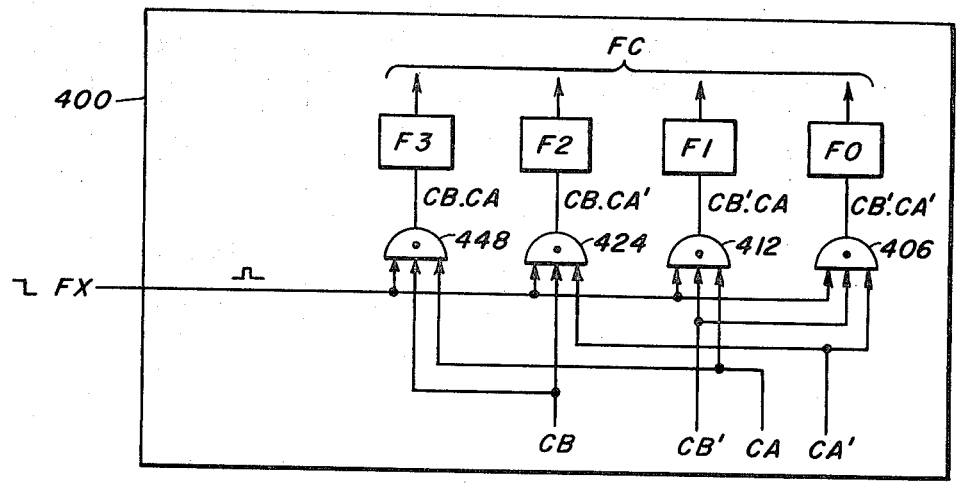

METHOD AND APPARATUS FOR PULSE WIDTH MODULATION WITH VARIABLE FREQUENCY MODES

CROSS-REFERENCES TO RELATED APPLICATIONS

1. Application Ser. No. 219,704, filed Jan. 21, 1972 and entitled "Method and Apparatus for Providing Efficient and Stable Power Inversion with Voltage and Frequency Control" and
2. Application Ser. No. 219,732, filed Jan. 21, 1972 and entitled "Method and Apparatus for Center-Referenced Pulse Width Modulation."

BACKGROUND OF THE INVENTION

While the invention may find general usage in any system where pulse width modulation is employed for control purposes, it is particularly directed to a system where three-phase power is supplied to an induction, synduction, or synchronous motor. It has been found that, where a variable speed drive is required for an alternating current motor, more precise control may be obtained through the use of pulse width modulation inverters than through other means where the voltage and frequency controls are separated. It is possible, for example, to control the direct current bus voltage to obtain the desired voltage control while independently varying the frequency. In the case where the alternating current motor is either an induction or a synduction motor, the operation should be maintained at a relatively constant V/F (voltage/frequency) ratio in order to maintain a constant level of flux in the motor. This type of control is sometimes referred to as a constant torque output control. It is advantageous therefore to utilize the pulse width modulation inverter system where voltage and frequency are controlled through the same system.

In prior art PWM (pulse width modulating) inverter systems, the number of pulses to be modulated during each period of the desired input frequency remains constant. This means that the modulated pulse (MP) frequency is set at a fixed multiple of the input frequency. Typically, the product of the multiple times the input frequency has been limited to a modulation carrier frequency of about 720 hertz. Thus, where six pulses (the multiple equal 6) are modulated during each input frequency period, the modulation carrier frequency reaches a limit of 720 hertz when the input frequency is 120 hertz.

When it is desired to drive an alternating current motor at a lower frequency, in a system where the modulation pulse multiple remains constant, the increased modulation pulse period becomes long relative to the motor time constant with the result that it is no longer possible to develop a smooth output control signal. If the motor drive input signals are measured during an output frequency operation of 5 hertz, for example, very sharp transients in the motor drive current would be noted since, at this frequency of operation, the modulation pulse period exceeds that of the motor time constant.

Thus, in prior art systems, either the PWM inverter control is cut off for low frequency operations and the voltage control is taken over by other means, or a very rough motor control results with a high level of transients therein.

SUMMARY OF THE INVENTION

According to the basic method of the invention, the number of pulses which are modulated during each period of the input frequency to a pulse width modulator is controlled as a switching function of the frequency range sampled during the previous period. The method can best be explained by a specific example, although it will be understood that the technique is not limited to the example.

It is assumed in the illustrative utilization of the invention that it is desirable to modulate the maximum number of pulses per period of input frequency corresponding to the maximum frequency of the particular frequency range. Thus, if the maximum frequency of operation is assumed to be 120 hertz, then the frequency multiple selected is six pulses per period (6.Fout). If the frequency then falls below 60 hertz, assumed to be the lower limit of the high frequency range, the invention automatically switches to a multiple of 12 to provide a maximum carrier frequency of 720 hertz. Thus, a second pulse series is generated which is referred to as 12.Fout. In a similar manner, when the frequency falls below 30 hertz, 24 pulses are generated for each period of Fout, and the frequency multiple 24.Fout is used; and when the frequency falls below 15 hertz, the multiple becomes 48 and the pulse series is referred to as 48.Fout.

The apparatus of the invention continuously samples a representation of the input frequency (selected to be one of the multiples thereof) and develops what is referred to herein as a frequency sample code (CC). Once during each period of the input frequency, the frequency sample code is transferred into a memory which then produces a frequency gating code (FC), representing the frequency range sampled during the previous period. The frequency control code FC is utilized to select the particular pulse multiple series which is appropriate for the frequency range previously sampled. Thus, sub-multiple frequency gates are provided which select, under the control of code FC, the proper pulse series for pulse width modulation. The selected sub-multiple pulse series is then referred to as a gating pulse series (GP) and is applied to the pulse width modulator, which may be of the type described in copending application constituting Reference (2) above. The pulse width modulator also receives the frequency code signals FC as well as a representation of the desired voltage output (Vout) and the desired frequency output (Fout).

The above and other objects and features of the invention, will become apparent from the following detailed description taken in connection with the accompanying drawings which form a part of this specification, and in which:

FIG. 2A is a chart showing the relationship between the frequency sample code CC, the frequency control code FC, the number of pulses per period of the selected sub-multiple pulse series, and the frequency range sampled by the system;

FIG. 3 is a schematic diagram illustrating one form of means 300 of FIG. 1;

FIG. 4 is a schematic diagram illustrating a suitable form of means 400 of FIG. 1;

Figure 1:
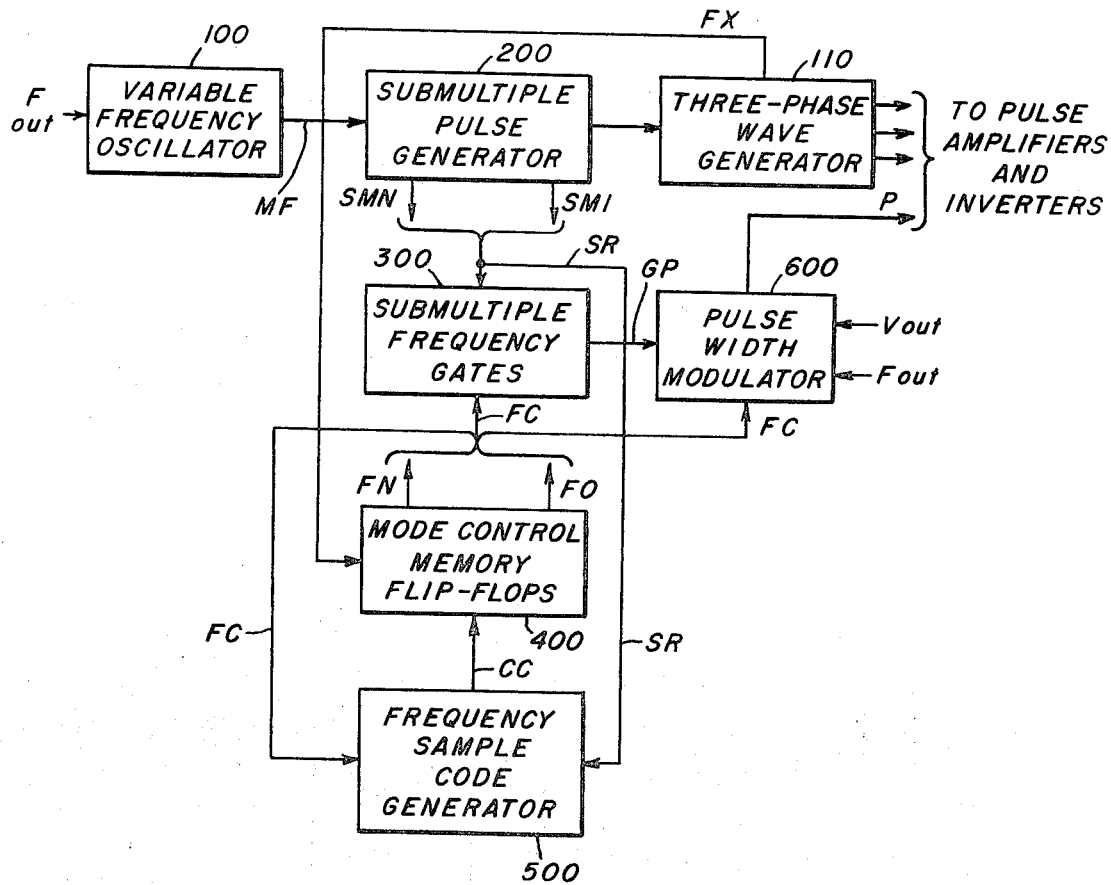
FIG. 1 is a block diagram of a system employing the invention.
Figure 2:
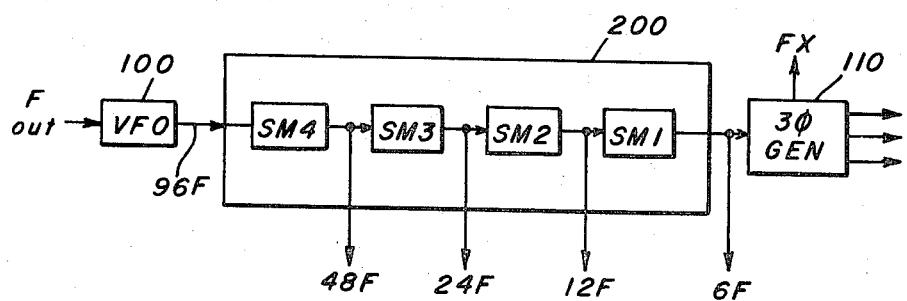
FIG. 2 is a block diagram of sub-multiple pulse generator 200 of FIG. 1.

Referring now to FIGS. 1 and 2, it will be noted that an input signal representing the desired output frequency (Fout) is applied to a variable frequency oscillator 100 which produces an output signal MF, designated in FIG. 2 as equal to 96F, where F represents Fout. Signal MF is applied to a sub-multiple pulse generator 200 which produces a plurality of series of sub-multiple pulses SM1-SMN corresponding to the number of frequency ranges desired. In FIG. 2, only four ranges are defined where the pulse series produced by sub-multiple flip-flops SM1–SM4 are referenced as 6F through 48F. Sub-multiple series SM1 is also applied to a three-phase wave generator 110 which produces signal FX. Generator 110 is fully described in copending application constituting Reference (1) above and does not form part of the present invention. The plurality of sub-multiple pulse series SM1–SMN are applied to sub-multiple frequency gates 300 (see also FIG. 3) which also receive the frequency code FC previously mentioned. The output of means 300 is the selected pulse series GP which is applied to pulse width modulator 600 which also receives the frequency control code FC. Code FC is obtained from mode control memory flip-flops 400 which receive a representation of a sample code CC at the time the FX pulse is generated by generator 110. Code CC is generated by means 500 which samples one of the sub-multiple frequencies referenced as SR as a reference corresponding to Fout. It will be noted that code CC is also a function of the previously-stored frequency range code FC. This feedback of FC to generator 500 is important in order to establish the upper and lower limits defining each frequency range boundary as will be more fully considered below.

Figure 4A:
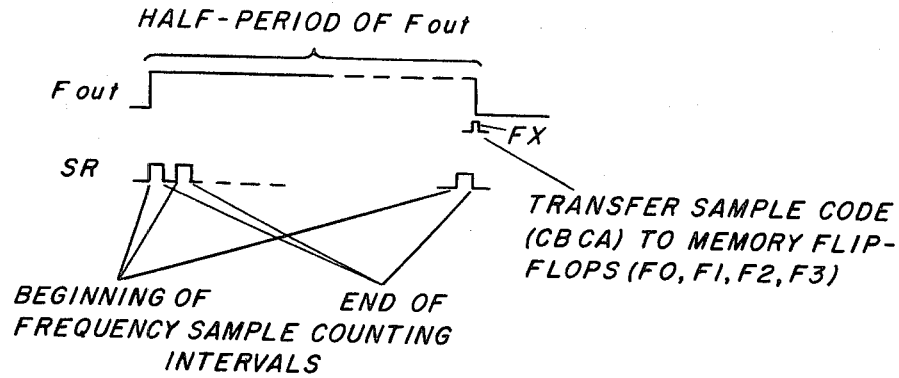
FIG. 4A shows the waveforms of signals utilized in the operation of the arrangement of FIG. 4.

As noted in FIG. 3, gates 300 provide the function of selecting which of the sub-multiple pulse series is to be utilized to represent the output gating pulse series GP. While many types of circuits may be utilized, the arrangement is shown as a combination of AND circuits 306 through 348 under the control of frequency code flip-flops F0–F3, the output of gates 306 through 348 being applied to an OR circuit 350 producing gate pulses GP and an inverter 351 produces complementary pulses GP'. The logic for the arrangement of FIG. 3 should be apparent from a consideration of FIG. 2A where it will be noted that flip-flop F0 is ON during the 6 multiple period. F1 is ON during the 12 multiple period, F2 is ON during the 24 multiple period, and F3 is ON during the 48 multiple period. The frequency ranges corresponding to the selected multiples are also set forth in FIG. 2A. In the logic of the circuit of FIG. 4, gates 406–448 translate the sample codes shown in FIG. 2A into the respective flip-flop setting. Thus, sample code 00 (CB'.CA') turns F0 ON, code 01 sets F1, code 10 sets F2, and code 11 sets F3.

Figure 5:
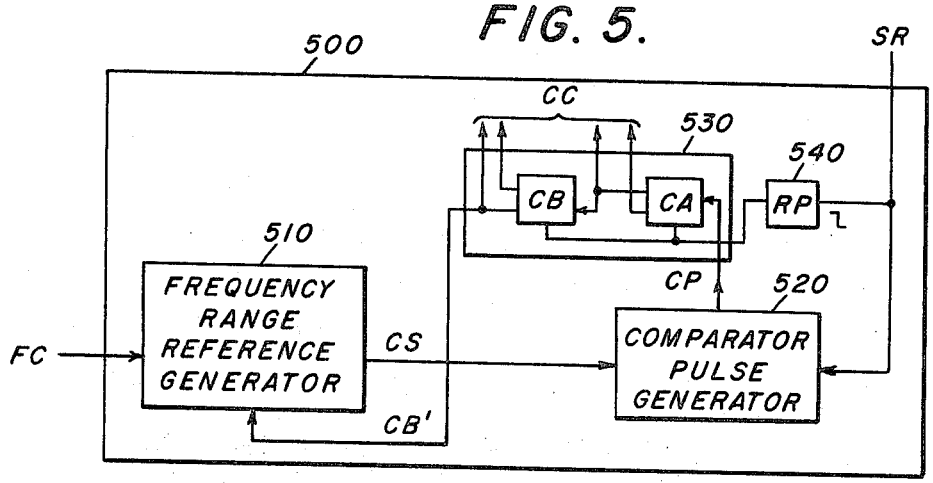
FIG. 5 is a block diagram of means 500 of FIG. 1.
Figure 5A:
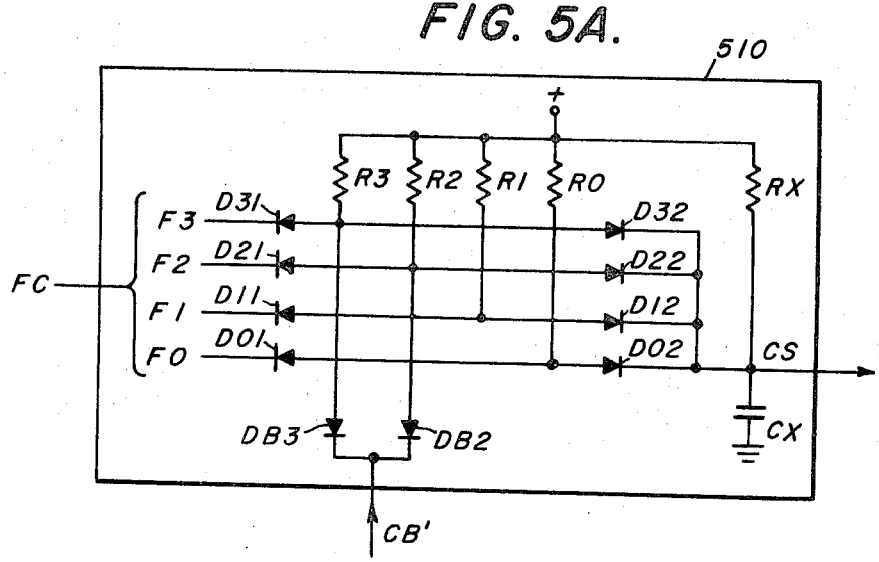
FIG. 5A is a schematic diagram of a preferred form of frequency range reference generator 510 of FIG. 5.

The manner in which code CC is developed will be considered briefly first with reference to FIG. 5 and then in detail with reference to FIGS. 5A–5E. Referring first to FIG. 5, it will be noted that the previously-stored frequency code FC (flip-flops F0–F3) is applied to a frequency range reference generator 510 which produces an output sweep signal CS having a time constant corresponding to the particular frequency range. A comparator pulse generator 520 receives the reference signal SR which is assumed, as an illustration, to be equal to 48Fout. Signal SR is also applied to a reset pulse generator (RP)540 which resets counter 530 at the end of each sampling period as will be noted in FIG. 4A. The function of comparator 520 is to produce a count pulse for counter 530 each time the frequency reference sweep signal CS crosses a reference level during the time the signal SR is ON. This function will be understood more clearly after the specific circuit of FIG. 5A is considered.

Referring now to FIG. 5A, it will be noted that the frequency code FC is applied to a set of input diodes D01–D31 which receives flip-flop signals F0–F3, respectively. These diodes are connected to respective time constant resistors R0–R3 and are coupled to a second series of diodes D02–D32 providing charging current for a capacitor CX which also receives charging current through a resistor RX. The junction of resistor RX and capacitor CX provides output signal CS. Signal CB' from counter flip-flop CB of counter 530 is fed back through diodes DB3 and DB2 to terminate charging current through resistors R3 and R2, respectively, when counter flip-flop CB is ON. Thus, when the complementary signal CB' is OFF, or ground, no current may pass through diodes D32 and D22 to capacitor CX. The operation of the circuit of FIG. 5A will now be considered with reference to the waveforms of FIG. 5B.

Figure 5B:
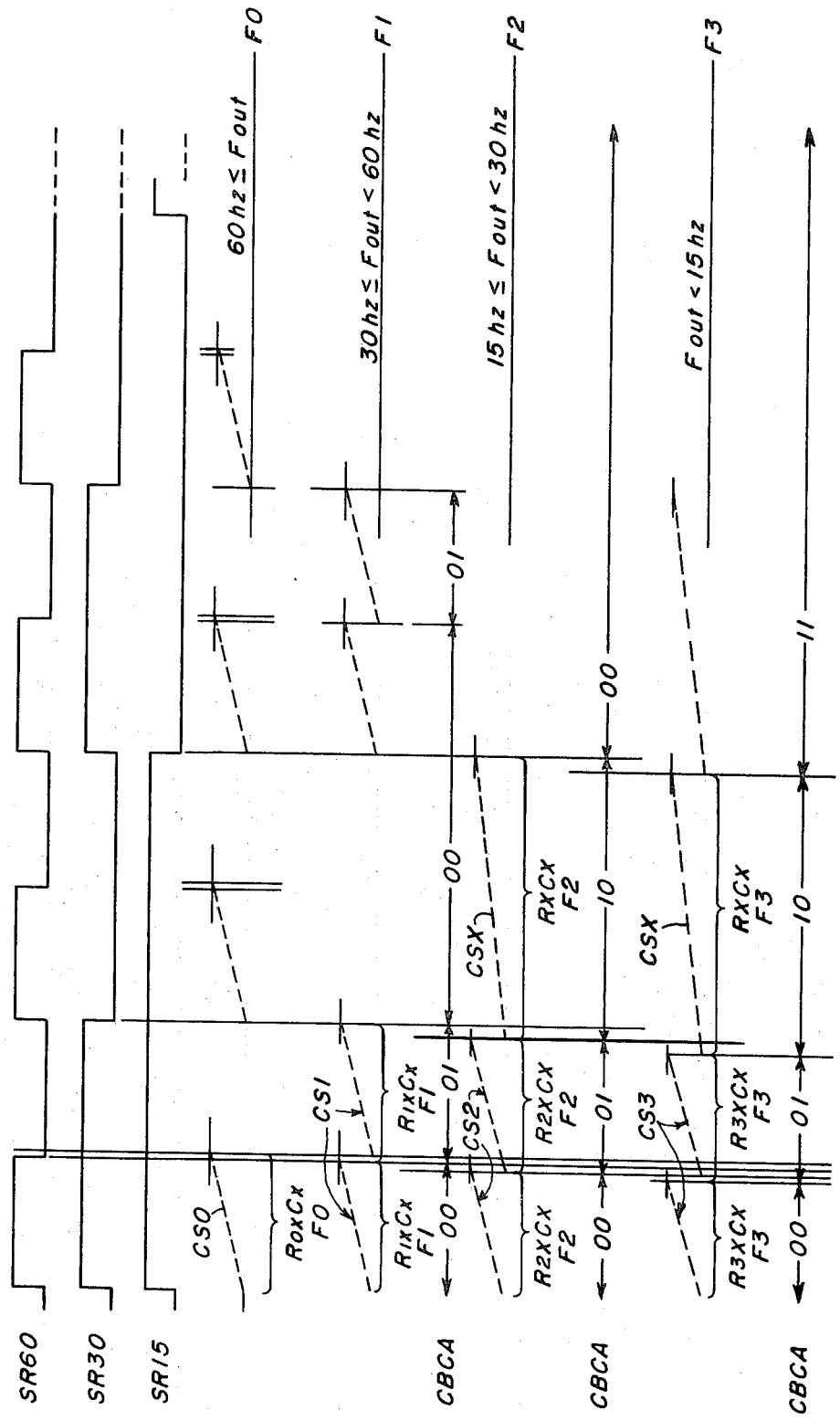
FIGS. 5B–5E show waveforms illustrating the operation of means 500 of FIG. 1.

In FIG. 5B, three different reference frequencies SR60 (60 Hz), SR30 (30 Hz) and SR15 (15 Hz) are shown in order to define different periods. It will be assumed first that the reference is SR60 and that the frequency range represented by F0 is present. In this case, only diode D01 is back-biased, enabling resistor R0 which, in parallel with esistor RX supplies current to capacitor CX. This time constant is referenced in FIG. 5B as R0xCx. The sweep signal CS is referenced as CS0 and reaches its upper reference level after the termination of signal SR60 so that no count pulse is generated. Thus, the count code at the end of each ampling period remains at 00 and is not shown. As the frequency decreases to the range represented by F1, diode D11 enables resistor R1 which, in parallel with resistor RX, provides current for capacitor CX. The time constant is referenced as R1xCx. In this case, a single count pulse is generated during each sampling period, so that the count code CC increases from 00 to 01, being transferred to flip-flop F1 by pulse FX (once each period of Fout). It will be noted that the time constant R1xCx is somewhat shorter than R0xCx so that, if the frequency increases again, the 60 hertz boundary is not crossed until the output frequency is slightly higher than the frequency limit which caused switching from F0 to F1 in the first place. A suitable crossover limit for decreasing frequency, for example, could be 59 hertz. Then the return crossover, or second limit, may be selected to be 61 hertz. Thus, F1 is turned ON and F0 is turned OFF when the frequency drops to 59 hertz, but F0 is not turned ON again until Fout reaches 61 hertz. Other upper and lower limits may be defined. For example, the upper limit may be 60 hertz and the lower limit 59 hertz. Each boundary, however, must be defined with upper and lower limits in order to prevent oscillation across the boundary which would make the system unstable.

In a similar manner, when the frequency drops below the 30 hertz boundary, which is defined by the period of two sweeps of signal CS1, the limit is effectively moved to the left in time (the period is shortened) as defined by two sweeps CS2. Thus, if the control switches from F1 to F2 at 29 hertz, it cannot return from F2 to F1 until 31 hertz is crossed, although other suitable upper and lower limits may be utilized.

If a second pulse is generated, where sweep CS2, for example, crosses the reference line two times, the count control code CC progresses from 00 to 01 and then to 10, the time constant of the sweep generator is changed from R2xCx to RxCx. This occurs because of the operation of the feedback signal CB' to diodes DB3 and DB2. This cuts off the current contributions of resistors R3 and R2 and the sweep then is represented as CSX.

A similar type of sampling control is utilized during the period represented by F3 when the first two pulses are generated by comparing sweep CS3 to the limit where the time constant is R3xCx, and the third pulse occurs because the sweep CSX crosses the reference to cause the count code to become 11. It will be noted that as a boundary is crossed in the direction of decreasing frequency, the time constant is also shifted slightly to the left creating a "hysteresis" which protects the system against oscillation.

Figure 5C:
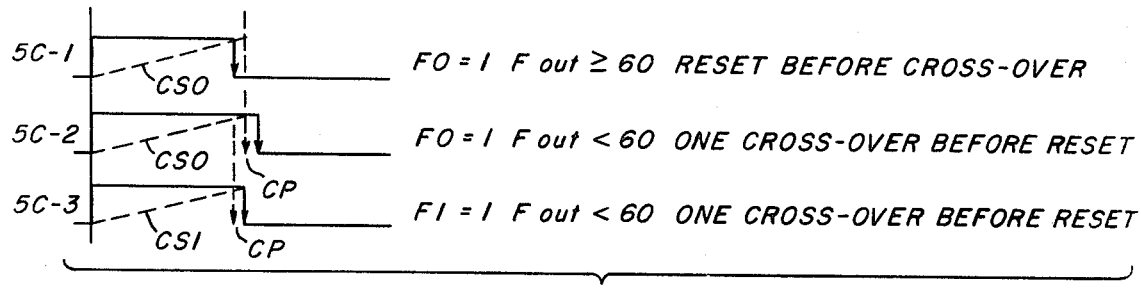
Figure 5D:
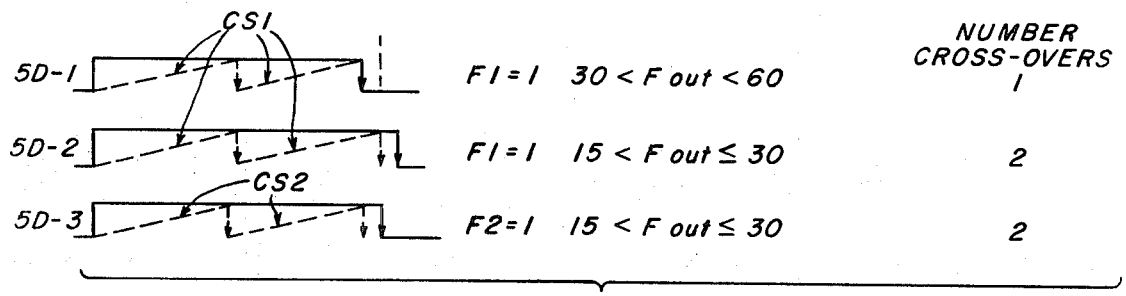
Figure 5E:
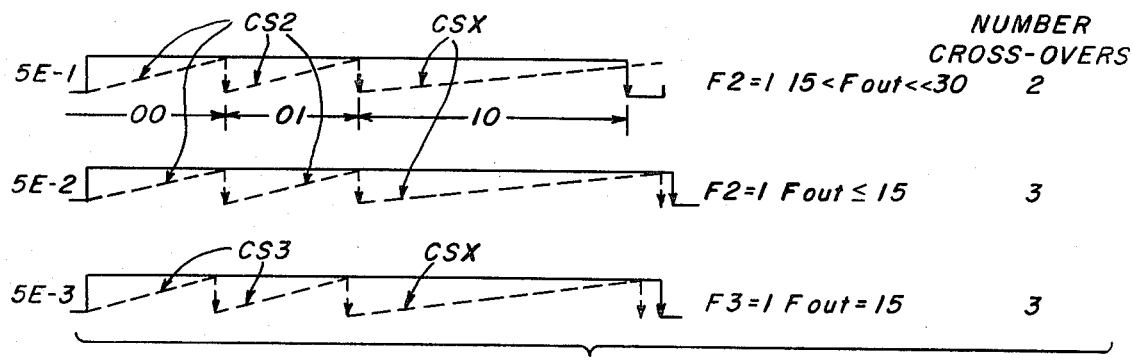

The "hysteresis" effect of the arrangement of FIG. 5A will be more fully understood after considering FIGS. 5C–5E. Referring, in particular, to FIG. 5C, it is assumed, at the start, (FIG. 5C-1) that F0 equals 1, and that the output frequency is greater than or equal to 60 hertz. The sweep signal CS0 does not cross the reference line before the end of the reference period so that no count pulse is generated. Therefore, the system remains in control mode F0. In FIG. 5C-2, however, CS0 reaches the reference level before the end of the period so that a count pulse (CP) is generated. It may then be assumed that F0 changes to F1 and in FIG. 5C-3 sweep CS1 continues to generate a count pulse, maintaining the system in the F1 mode, even though the frequency has increased because it has not crossed the second limit.

Similar upper and lower limit crossover conditions are set forth in FIGS. 5D and 5E corresponding to the boundaries for 30 and 15 hertz, respectively. Understanding of these conditions should be apparent from those previously considered and will not be discussed further.

Figure 6:
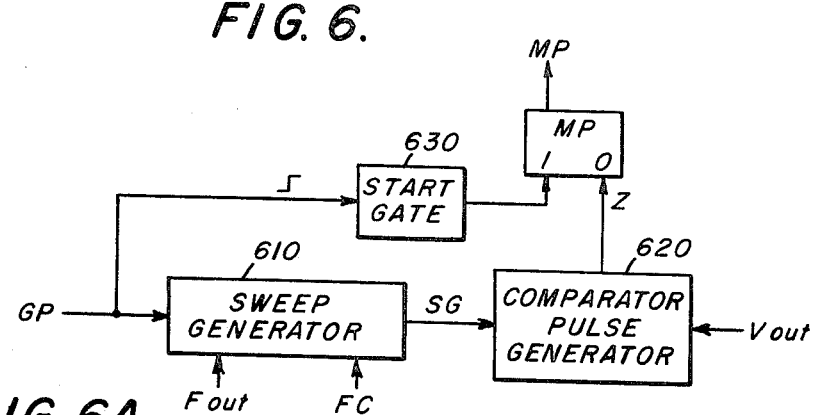
FIG. 6 is a block diagram of one form of pulse width modulator 600.
Figure 6A:
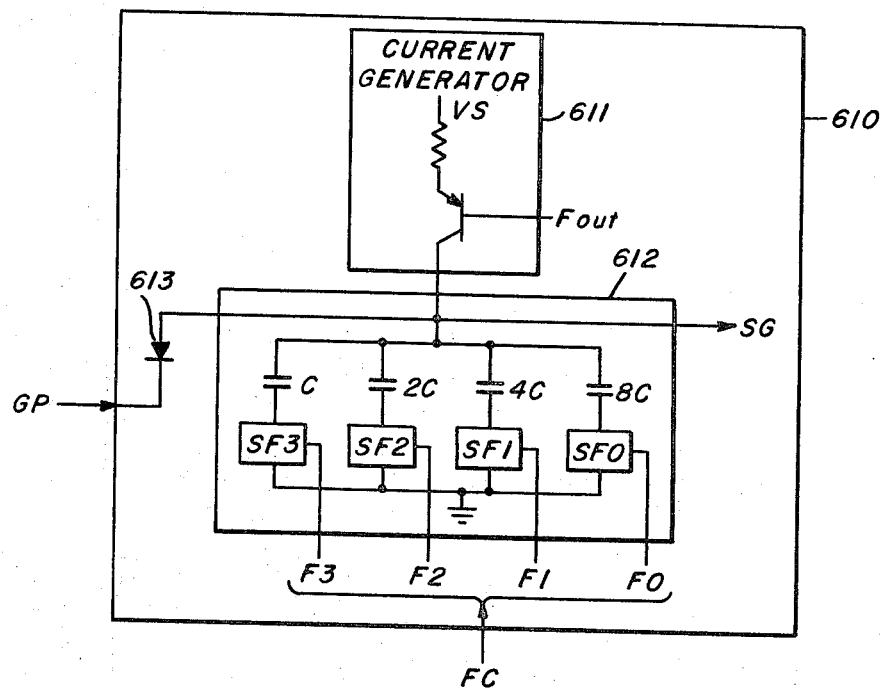
FIG. 6A is a schematic diagram of a circuit suitable for sweep generator 610 of FIG. 6.
Figure 6B:
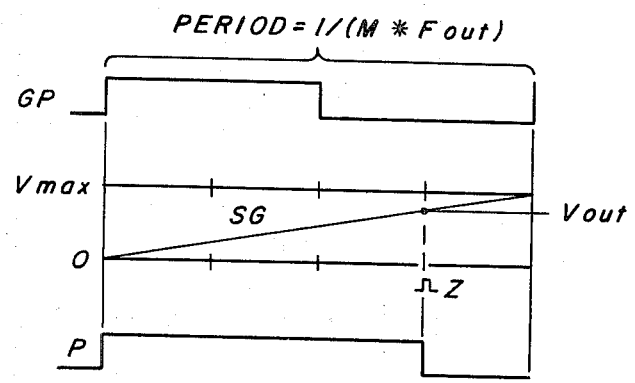
FIG. 6B shows waveforms illustrating the operation of pulse width modulator 600.

In FIG. 6A, a simplified version of a pulse width modulator suitable for use with the invention is shown. It is preferred in actual practice, however, to utilize the improved center-reference modulator described in detail in copending application constituting Reference (2) above. In FIG. 6A, a modulator output flip-flop MP is turned ON through a start gate 630 which responds to the leading edge of signal GP. Thus, the output signal MP, as shown in FIG. 6B, turns ON immediately upon receipt of the start of signal GP. As soon as flip-flop MP is turned ON, sweep generator 610, shown in particular form in FIG. 6A, begins generating output signal SG which starts from 0 and rises at a linear rate. If the maximum voltage (Vmax) were to be represented, signal SG would reach the maximum exactly at the end of the period represented by GP. Signal SG is applied to a comparator pulse generator 620 which also receives signal Vout and generates a reset signal Z which turns flip-flop MP OFF to provide the desired pulse width. In FIG. 6A, a constant current generator 611 receives a representation of Fout and generates a current corresponding thereto to charge one of four capacitors referenced as C, 2C, 4C and 8C. The capacitors are gated into operation by signals F0-F3 through switches SF0-SF3 so that, as the number of pulses per period is doubled, the time constant is reduced proportionally. For example, when the system switches from F0 to F1, circuit 612 then switches from 8C to 4C so that the modulation period is cut in half (twice the frequency). Thus, if FIG. 6B were considered to be representative of the pulse modulation for one of pulses GP during the six pulse period operation, switching to the F1 control would cause GP to double frequency and, therefore, signal SG is generated twice during the period of time represented in FIG. 6B. As a result, instead of a single modulated output pulse MP there would be two pulses MP representing the same period.

From the foregoing description, it should now be apparent that the present invention provides a method and apparatus for increasing the voltage and frequency control capabilities of a pulse width modulating inverting system. While particular frequency boundaries have been described and a preferred arrangement has been shown for defining upper and lower limits relating to certain frequency boundaries, it will be understood that the concept herein has general application to any system where different multiples of modulated pulses are used for different frequency ranges.

I claim:

1. A method of pulse width modulation wherein the modulated output pulse frequency is at a variable multiple of input frequency comprising: periodically sampling a representation of input frequency to produce sample code signals representing different frequency ranges; translating the sample code signals into a corresponding plurality of frequency gate control signals, one for each frequency range; generating a pulse series for each of the frequency ranges as a multiple of the input frequency where the multiple increases for successively lower frequency ranges; generating a series of gating pulses corresponding to that pulse series whose multiple is selected by said frequency gate control signals, and driving a pulse width modulator with said series of gating pulses.

2. In a pulse width modulator, the combination of first means for generating a plurality of pulse series where the pulse rate in each series is a predetermined multiple of the frequency of an input signal applied to the modulator, and each pulse series corresponds to a respective one of a plurality of frequency ranges; second means for periodically sampling a representation of the input frequency to the modulator to produce a sample code signal set identifying the frequency range; third means for producing a series of gate pulses having a pulse rate during a period corresponding to the code signal set sampled during the previous period; and fourth means responsive to said gate pulses and said code signal set and to a representation of output voltage from the modulator for producing pulse width modulation output signals.

3. The method of pulse width modulation comprising generating control code signals representing each of a plurality of frequency ranges of an input signal, producing a pulse chain for each frequency range with a multiple number of pulses therein corresponding to the range, the pulse rate in each chain being inversely related to the maximum frequency of the associated range, and driving a pulse width modulator with gating pulse selected to correspond to the pulse chain gated by said control code signals.

4. The method of pulse width modulation wherein the modulated output pulse frequency is a variable multiple of input frequency, comprising driving a pulse width modulator with a series of gating pulses which determine the number of pulses to be modulated during a predetermined period of the input frequency, sampling the frequency range of the input frequency during each period of the input frequency, and controlling the number of pulses to be modulated during each period of the input frequency as a switching function of the frequency range sampled during a previous period.

5. In a pulse width modulator adapted to produce output pulses which vary over a predetermined frequency range regardless of the frequency of input signals applied to the modulator; the combination of means for generating a plurality of pulse trains wherein the pulse rate in each train is a predetermined multiple of the frequency of said input signal applied to the modulator and each pulse train is representative of a respective one of a plurality of frequency ranges of said input signal; second means for periodically sampling a representation of the input frequency to the modulator to produce a digital signal identifying the frequency range of the input signal applied to the modulator; third means coupled to said second means and responsive to said digital signal for producing a series of gate pulses having a pulse rate which varies as a function of the numerical value of said digital signal; and fourth means responsive to said gate pulses, to said digital signal and to a representation of output voltage from the modulator for producing pulse width modulated output signals which vary over a predetermined fixed frequency range regardless of the frequency of said input signal.

* * * * *